2,863,915

PREPARATION OF DIALKOXYPHENYL THIOPYRUVIC ACIDS

Oliver H. Emerson, Orinda, Calif., assignor to the United States of America as represented by the Secretary of Agriculture No Drawing. Application January 22, 1958
Serial No. 710,587

3 Claims. (Cl. 260—516)

(Granted under Title 35, U. S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has as its principal object the provision of improved processes for synthesizing dialkoxyphenyl thiopyruvic acids. Further objects and advantages of the invention will be evident from the description herein.

It is known in the art that certain dialkoxyphenyl thiopyruvic acids can be prepared by reacting the corresponding dialkoxybenzal rhodanines with alkali. This procedure has been advocated for the preparation of 3,4-dimethoxyphenyl thiopyruvic acid from 3,4-dimethoxybenzal rhodanine; 4-methoxyphenyl thiopyruvic acid from 4-methoxybenzal rhodanine, and 3,4-methylenedioxyphenyl thiopyruvic acid from 3,4-methylenedioxybenzal rhodanine.

It has now been found that the alkaline cleavage of dialkoxybenzal rhodanines to form the corresponding dialkoxyphenyl thiopyruvic acids is substantially enhanced by the addition of an alkali metal sulphide to the reaction system. The primary advantage is that the yield of dialkoxyphenyl thiopyruvic acid is materially increased. The process of the invention, which involves essentially contacting a dialkoxybenzal rhodanine with aqueous alkali in the presence of an alkali metal sulphide, thus affords a means for preparing dialkoxyphenyl thiopyruvic acids in greater yields than previously possible.

The process of the invention may be applied to any dialkoxy benzal rhodanine, such compounds being deisgnated by the formula—

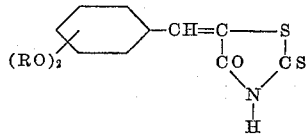

wherein R represents an alkyl radical, for example, methyl, ethyl, propyl, isopropyl, n-butyl, 2-butyl, tert.-butyl, 2-methylpropyl, hexyl, octyl, decyl, dodecyl, etc.

The process of the invention is particularly advantageous when applied to compounds of the above formula wherein the alkoxy groups are on the 2 and 4 positions of the phenyl radical. In such case the yields are especially high as compared with the known process wherein the 2,4-dialkoxybenzal rhodanines are reacted with alkali alone.

The invention is further demonstrated by the following illustrative example:

EXAMPLE I

A. *Preparation of 2,4-dimethoxybenzal rhodanine*

Rhodanine (40 g.), 2,4-dimethoxybenzaldehyde (50 g.), anhydrous sodium sulphate (150 g.), and acetic acid (200 ml.) were combined, heated to 130° C. and maintained for a half hour at this temperature. The reaction product was cooled, an equal volume of water was added, and the mixture was filtered. The product collected on the filter was washed with water and then with hot alcohol to remove dark-colored impurities. The product, 2,4-dimethoxybenzal rhodanine, was obtained in a yield of 79 g. (93% of theory), M. P. 267–270° C.

For analytical purposes, a part of the product was recrystallized from n-butanol, of which 150 ml. was needed to dissolve 1 gram. The recrystallized compound was obtained as tufts of orange-yellow needles, M. P. 275° C. *Analysis.*—Calculated for $C_{12}H_{11}NO_3S_2$: C, 51.21%; H, 3.95%. Found: C, 51.4%; H, 3.92%.

B. *Preparation of 2,4-dimethoxyphenyl thiopyruvic acid*

2,4-dimethoxybenzal rhodanine (20 g.) was suspended in a mixture of 80 ml. of 15% aqueous sodium hydroxide solution and 20 ml. of 14% aqueous sodium sulphide solution in a 500 ml. Erlenmeyer flask. After displacing air by nitrogen, the flask was heated on a steam bath until all the solids had dissolved (ca. 7 minutes), then for 5 minutes more. The reaction mixture was then cooled in an ice bath and acidified with 100 ml. of 10% hydrochloric acid. The precipitate was filtered, washed with water, then extracted with 200 ml. of ethyl acetate. The ethyl acetate extract, after separation of water therefrom, was concentrated under slightly reduced pressure to about 70 ml. then allowed to stand. The product separated as yellow to orange crystals which were removed from residual liquid and washed with toluene. The toluene washings were concentrated to recover further crops of the product. The product, 2,4-dimethoxyphenyl thiopyruvic acid, which can be conveniently recrystallized from toluene, was obtained in a yield of 13.6 g. (82% of theory), M. P. 168–170° C. *Analysis.*—Calculated for $C_{11}H_{12}O_4S$: C, 54.98%; H, 5.04%. Found: C, 55.2%; H, 5.11%.

The reaction in step B is illustrated by the following equation:

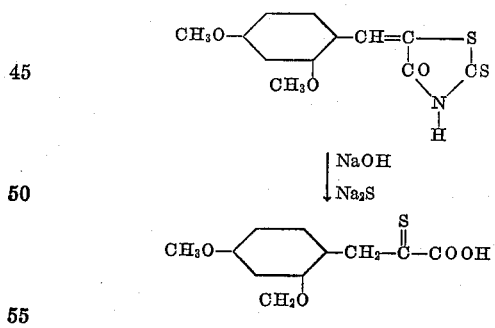

For comparative purposes, the procedure set forth above in Example I, part B was repeated but without addition of the sodium sulphide. In this case the yield of 2,4-dimethoxyphenyl thiopyruvic acid was 75%.

It will be found in a practice of the method exemplified above that many variations may be followed within the scope of the invention. For example the alkali used in the cleavage reaction need not be sodium hydroxide; one may use other equivalent alkalis such as potassium hydroxide, barium hydroxide, calcium hydroxide, sodium or potassium carbonates, and the like. A molar excess of alkali is generally employed, preferably about 4 to 5 mols of alkali per mol of dialkoxybenzal rhodanine, dissolved in sufficient water to form a solution containing about 5 to 25% of alkali. With regard to the sulphide reagent, sodium sulphide is preferred but other water-soluble inorganic sulphides such as sodium hydrosulphide, potassium hydrosulphide, potassium sulphide, ammonium sulphide, or the like may be employed. In general, enough of the sulphide is added to furnish at least 1/10 mol of sulphide per mol of dialkoxybenzal rhodanine. Usually it is preferred to employ larger proportions of sulphide, for example ½ to 1 mol thereof per mol of benzal rhodanine. Larger proportions of sulphide can be employed but generally without any particular advantage or disadvantage. The temperature at which the alkaline cleavage is conducted is not critical and may vary about from 5 to 100° C. It is preferred to carry out the process at or near the boiling point (about 65–100° C.) to accelerate the cleavage. The reaction is preferably carried out under an atmosphere of an inert gas, such as nitrogen, to minimize oxidative side-reactions. The conversion to the substituted thiopyruvic acid is generally complete when the starting material completely dissolves in the aqueous alkali and sulphide solution. The product can readily be recovered from the solution by addition of water and acidification to form the essentially water-insoluble dialkoxyphenyl thiopyruvic acid.

It is evident that by selection of the starting material (the dialkoxybenzal rhodanine), the process of the invention can be utilized for the production of any dialkoxyphenyl thiopyruvic acid, such compounds being designated by the formula—

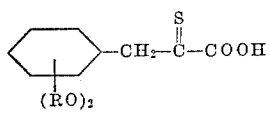

wherein R represents an alkyl radical, for example, methyl, ethyl, propyl, isoproyl, n-butyl, 2-butyl, tert.-butyl, 2-methylpropyl, hexyl, octyl, decyl, dodecyl, etc.

The products of the process of the invention are useful as intermediates for the production of various compounds for example dialkoxyphenyl acetonitriles and β(dialkoxyphenyl) ethyl amines. The 2,4-dialkoxyphenyl thiopyruvic acids, particularly those wherein the alkoxy groups are of short carbon length such as methoxy, ethoxy, propoxy, isopropoxy, and butoxy, are useful for the preparation of coumestrol and coumestrol esters. As disclosed in the copending applications of E. M. Bickoff and A. N. Booth, Serial No. 693,785, filed October 31, 1957, and O. H. Emerson and E. M. Bickoff, Serial No. 710,586, filed January 22, 1958, coumestrol and its esters exhibit estrogenic properties and are useful in animal raising to increase growth rate and to increase the efficiency of feed utilization. As a typical example, coumestrol or coumestrol diacetate may be incorporated in minor proportion, for example 0.001 to 1 lb. per ton, in conventional feeds containing a major proportion of vegetable material such as corn, wheat, barley, milo, alfalfa, soybean meal, etc. Such supplemented feed when supplied to animals particularly those grown for meat purposes, e. g. steers, will cause the animals to gain weight more rapidly and to produce more flesh per lb. of feed.

The synthesis of coumestrol and coumestrol diacetate is illustrated in the following example:

EXAMPLE II

A. *Preparation of β-(2,4-dimethoxyphenyl)-α-oximino propionic acid*

To a solution of 8 g. of sodium in 240 ml. of alcohol was added a concentrated aqueous solution of 24 g. of hydroxylamine hydrochloride. The solution was filtered to remove precipitated sodium chloride and the hydroxylamine-containing filtrate was added to 24 g. of 2,4-dimethoxyphenyl thiopyruvic acid and the solution refluxed as long as hydrogen sulphide was evolved (about 1 hour). The alcohol was removed under reduced pressure, the residue dissolved in an excess of 5% sodium hydroxide solution, and filtered to remove a small amount of 2,4-dimethoxyphenyl acetonitrile. The filtrate was acidified to pH 1.0 with hydrochloric acid and the precipitate filtered off. To recover the oximino acid from the filtrate, the latter was extracted with 200 ml. of ethyl acetate and the precipitate was dissolved in this extract. The ethyl acetate solution of the product was then concentrated under somewhat reduced pressure to a volume of 100 ml. To it was then added 2 volumes of benzene whereby the oximino acid separated as white needles which may be further purified by recrystallization from a mixture of 2 vols. benzene to one vol. ethyl acetae. The product, β - (2,4-dimethoxyyphenyl)-α-oximino propionic acid, was obtained in a yield of 20.4 g. (86% of theory, M. P. 149° C.).

B. *Preparation of 2,4-dimethoxyphenyl acetonitrile*

10 g. of β-(2,4-dimethoxyphenyl)-α-oximino propionic acid and 6 ml. of acetic anhydride were heated on a steam bath until reaction was initiated. The heating was then discontinued and the exothermic reaction permitted to continue while cooling the reaction vessel with cold water. The reaction was complete in a few minutes yielding a substantially quantitative yield of 2,4-dimethoxyphenyl acetonitrile.

C. *Preparation of omega(2,4-dimethoxyphenyl) resacetophenone*

This compound was prepared by condensing resorcinol with 2,4-dimethoxyphenyl acetonitrile in the presence of hydrogen chloride and zinc chloride in accordance with Boyd and Robertson (Jour. Chem. Soc. (London), 1943, p. 175).

D. *Preparation of 3(2,4-dimethoxyphenyl)-4,7-dihydroxy coumarin*

Omega (2,4-dimethoxyphenyl) resacetophenone (3.1 g.), acetone (50 ml.), methyl chloroformate (2 ml.), and potassium carbonate (8 g.) were refluxed for four hours. The reaction mixture was cooled, diluted with water (100 ml.) and acidified with hydrochloric acid. The precipitate was filtered, washed with water, and dried. The dry precipitate was dissolved in about 20 ml. of methanol and to this solution was added sufficient of a 20% solution of potassium hydroxide in methanol to turn alizarin-yellow orange (pH about 11). The solution was refluxed for 10 minutes under an inert atmosphere, then cooled, diluted with water, and acidified with hydrochloric acid. The precipitate was filtered off and recrystallized from alcohol. The product, 3(2,4 - dimethoxyphenyl)-4,7-dihydroxy coumarin, had a melting point of 250–255° C.

E. *Preparation of coumestrol*

One gram of 3(2,4-dimethoxyphenyl)-4,7-dihydroxy coumarin was mixed with 2 grams of aniline hydrochloride. The mixture was heated under an atmosphere of carbon dioxide for 2.5 hours at 210–220° C. The reaction mixture was cooled then successively extracted with water to remove aniline hydrochloride and then with ethyl acetate (about 10 cc.) to remove pigmented impurities. The residue was coumestrol, obtained in a yield of 60%. The product may also be termed 7',6-dihydroxy coumarino (3',4'-3,2)-coumarone.

F. *Preparation of coumestrol diacetate*

The coumestrol produced as above described was suspended in a mixture of 10 ml. of acetic anhydride and 1 g. of fused sodium acetate. The mixture was brought to a boil for a few minutes then poured into water. The coumestrol diacetate was filtered off and recrystallized from acetic acid. The recrystallized product had a melting point of 234–235° C. *Analysis.*—Calculated for $C_{19}H_{12}O_7$: C, 64.75%; H, 3.44%. Found: C, 64.7%; H, 3.51%. The yield was 50%, based on the amount of 3(2,4-dimethoxyphenyl)-4,7-dihydroxy coumarin. The product may also be termed 7',6-diacetyloxycoumarino-(3',4'-3,2)-coumarone.

The products have the following structure:

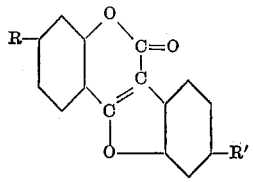

Coumestrol: R and R' are each —OH.
Coumestrol diacetate: R and R' are each

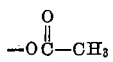

In the preparation of coumestrol and coumestrol diacetate by the procedures exemplified above, it is not essential to use 2,4-dimethoxyphenyl thiopyruvic acid as the starting material; other alkoxy groups may be present at the 2 and 4 positions. In general, the starting material may be any 2,4-dialkoxyphenyl thiopyruvic acid wherein the alkoxy groups are of short chain length such as methoxy, ethoxy, propoxy, isopropoxy, or butoxy. Such alkoxy groups are readily converted into hydroxy groups as required in the synthesis (step E of Example II).

Having thus described the invention, what is claimed is:

1. A process for preparing a 2,4-dialkoxyphenyl thiopyruvic acid which comprises reacting a 2,4-dialkoxybenzal rhodanine with aqueous alkali in the presence of an alkali metal sulphide to produce the 2,4-dialkoxyphenyl thiopyruvic acid.

2. A process for preparing a 2,4-dialkoxyphenyl thiopyruvic acid which comprises reacting a 2,4-dialkoxybenzal rhodanine with an aqueous solution of sodium hydroxide in the presence of sodium sulphide to produce the 2,4-dialkoxyphenyl thiopyruvic acid.

3. A process for preparing 2,4-dimethoxyphenyl thiopyruvic acid which comprises reacting 2,4-dimethoxybenzal rhodanine with an aqueous solution of sodium hydroxide in the presence of sodium sulphide to produce 2,4-dimethoxyphenyl thiopyruvic acid.

References Cited in the file of this patent

Barltrop: Chem. Absts., vol. 41, col. 957b (1947).
Fisher et al.: Chem. Absts., vol 41, col. 4470b (1947).
Grundon et al.: Chem. Absts., vol. 49, col. 13248e (1955).